(12) United States Patent
Biebuyck et al.

(10) Patent No.: US 10,743,476 B2
(45) Date of Patent: Aug. 18, 2020

(54) AGRICULTURAL BALER WITH PARTIAL BALE EJECT

(71) Applicant: CNH Industrial America LLC, New Holland, PA (US)

(72) Inventors: Ronald Biebuyck, Veurne (BE); Frederik Demon, Bruges (BE); Johan Dulst, Ichtegem (BE); Kenny Maelfeyt, Vlissegem (BE)

( * ) Notice: Subject to any disclaimer, the term of this patent is extended or adjusted under 35 U.S.C. 154(b) by 499 days.

(21) Appl. No.: 15/061,577

(22) Filed: Mar. 4, 2016

(65) Prior Publication Data

US 2016/0255777 A1 Sep. 8, 2016

(30) Foreign Application Priority Data

Mar. 5, 2015 (BE) .................................... 2015/5117

(51) Int. Cl.
*A01F 15/08* (2006.01)
(52) U.S. Cl.
CPC ................................ *A01F 15/0875* (2013.01)
(58) Field of Classification Search
CPC .......................... A01F 15/0875; A01F 15/042
USPC ..................................... 100/188 R, 218, 179
See application file for complete search history.

(56) References Cited

U.S. PATENT DOCUMENTS

| | | | | |
|---|---|---|---|---|
| 5,540,144 A * | 7/1996 | Schrag | ................ | A01F 15/0875 100/188 R |
| 7,093,537 B2 * | 8/2006 | Dubois | ............... | A01F 15/0875 100/188 R |
| 7,779,755 B2 * | 8/2010 | De Rycke | ........... | A01F 15/0875 100/188 R |
| 8,794,136 B2 | 8/2014 | Dumarey et al. | | |
| 8,915,182 B2 | 12/2014 | Van Groenigen | | |
| 8,978,550 B2 | 3/2015 | Demon | | |
| 9,185,846 B2 | 11/2015 | Dumarey | | |
| 2009/0249968 A1 * | 10/2009 | De Rycke | ........... | A01F 15/0875 100/188 R |
| 2013/0019765 A1 * | 1/2013 | Demon | ............... | A01F 15/0875 100/218 |
| 2013/0233187 A1 | 9/2013 | De Rycke et al. | | |
| 2015/0305245 A1 * | 10/2015 | Denson | ............... | A01F 15/0875 100/188 R |
| 2016/0021825 A1 | 1/2016 | Keller et al. | | |

FOREIGN PATENT DOCUMENTS

| | | |
|---|---|---|
| EP | 0810083 A2 | 12/1997 |
| EP | 0974260 A1 | 1/2000 |
| EP | 2759195 A1 | 7/2014 |

* cited by examiner

*Primary Examiner* — Adam J Eiseman
*Assistant Examiner* — Mohammed S. Alawadi
(74) *Attorney, Agent, or Firm* — Patrick Sheldrake; Peter Zacharias

(57) ABSTRACT

An agricultural baler includes a main bale chamber, a bale ejection system and a partial bale ejection system. The partial bale ejection system, incorporated in the floor of the main bale chamber, is arranged to move and eject a rearward bale proximate to the outlet of the main bale chamber. The partial bale ejection system having an actuator for moving the rearward bale and at least one tine that is pushed into the rearward bale prior to the actuator pushing the rearward bale alone toward and out the outlet.

20 Claims, 6 Drawing Sheets

AGRICULTURAL BALER WITH PARTIAL BALE EJECT

This application claims priority to Belgium Application BE2015/5117 filed Mar. 5, 2015, which is incorporated herein by reference in its entirety.

BACKGROUND OF THE INVENTION

The present invention relates to agricultural balers, and, more particularly, to agricultural square balers having a bale ejection system.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

As a field is completed the rearmost formed bale in the baler may need to be ejected prior to leaving the field, so that the bale will not later unintentionally leave the baler and to lighten the load carried by the baler.

What is needed in the art is an agricultural baler which efficiently ejects the rearmost bale with minimal wear on the components.

SUMMARY OF THE INVENTION

The present invention provides an agricultural baler with a partial bale ejection system.

The invention in one form is directed to an agricultural baler including a main bale chamber, a bale ejection system and a partial bale ejection system. The main bale chamber is for the compressing of crop material into bales. The main bale chamber has a floor and an outlet for the discharge of compressed crop material in the form of bales. The bale ejection system is at least partially incorporated in the floor for moving the bales substantially throughout the main bale chamber. The partial bale ejection system is also at least partially incorporated in the floor for moving a bale out the outlet. The partial bale ejection system is arranged to move and eject a rearward bale proximate to the outlet of the main bale chamber. The partial bale ejection system having an actuator for moving the rearward bale and at least one tine that is pushed into the rearward bale prior to the actuator pushing the rearward bale alone toward and out the outlet.

An advantage of the present invention is that the baler is able to eject the rearwardmost bale while minimizing wear on components of the partial bale ejection system.

Another advantage is that the components of the floor accommodate the passage of the crop material that is not captured in the bale to easily leave the floor area.

Yet another advantage is that the partial bale ejection system is centrally located in the floor to provide a singular pushing force to the rearmost bale.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
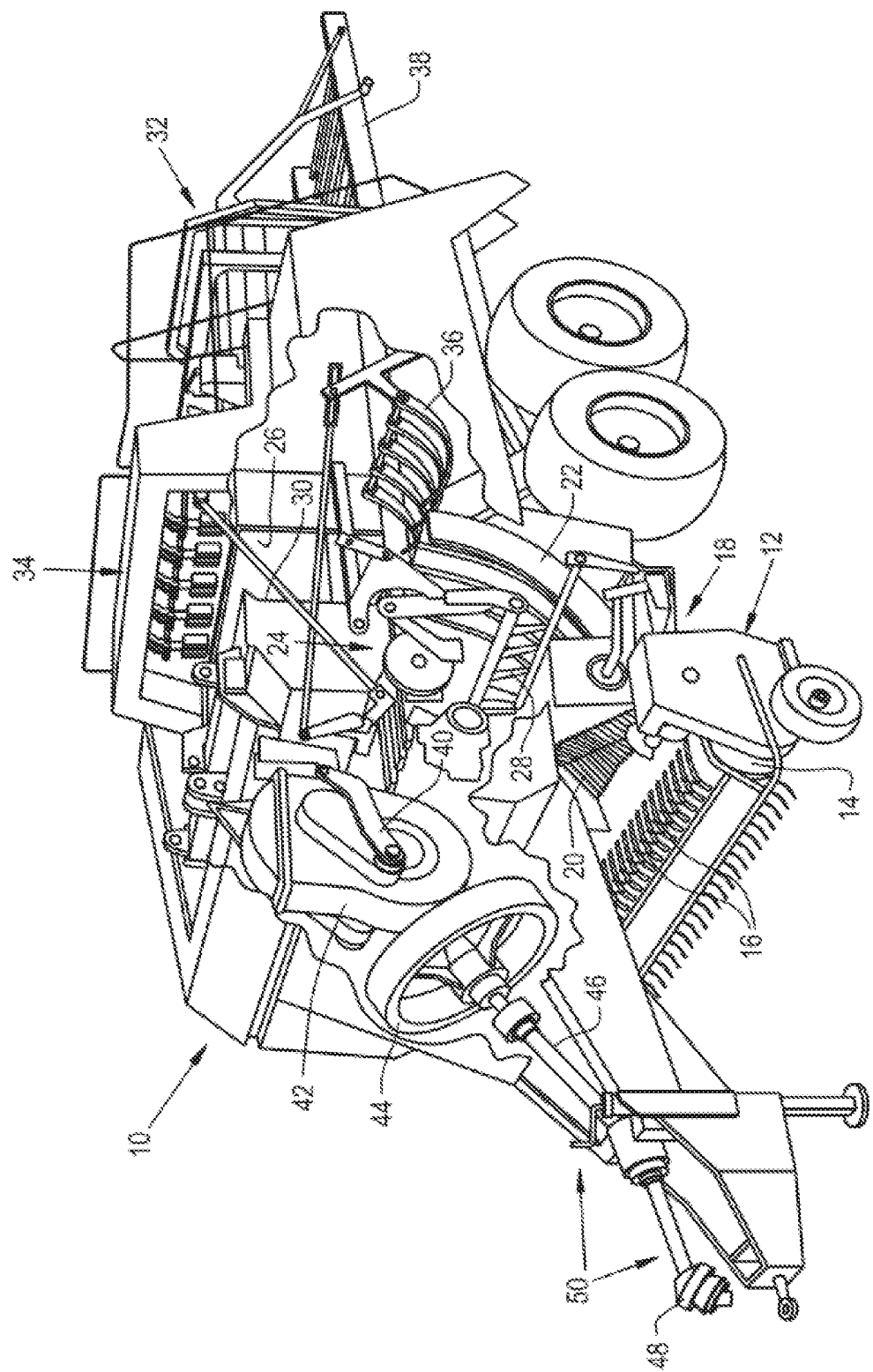
FIG. 1 is a perspective cutaway view showing the internal workings of a large square baler, which includes a partial bale ejector of the present invention.

Referring now to the drawings, and more particularly to FIG. 1, there is shown a perspective cutaway view showing the internal workings of a large square baler 10. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Figure 2:
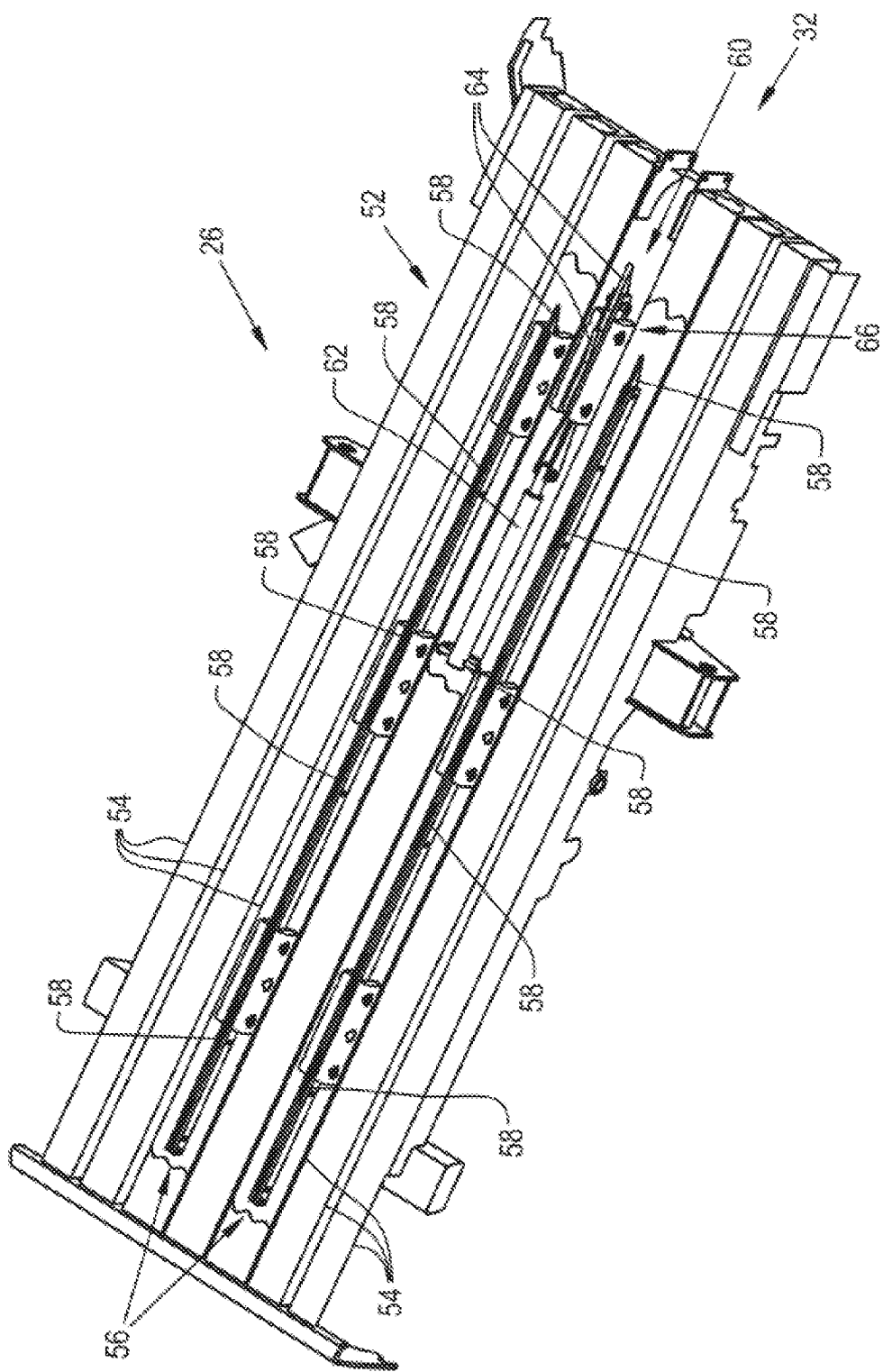
FIG. 2 is a perspective view of the floor of the main bale chamber illustrating the partial bale ejector system used in the baler of FIG. 1.

Now, additionally referring to FIG. 2, there is shown a partially cutout view of part of the main bale chamber 26, and more particularly a floor 52 of the main bale chamber 26. The floor 52 has several bale support members 54 or slats 54 upon which the bales slide as they are formed in the baler 10. The slats 54 may have a plastic lining or insert for low friction movement of the bales. Two of the slats 54 are cutout in FIG. 2 to show a bale ejection system 56 that has two actuators to move the bales in the main bale chamber 26. The bale ejection system 56 has multiple tines 58 located along the length of the main bale chamber 26 to engage the bales for pushing the formed bales. The tines 58 are biased upwardly so that they will engage the bale as the bale ejection system 56 pushes toward the rear of the main bale chamber 26. The tines 58, although being biased upward, disengage from the bales in a ratcheting manner relative to the bales as the bale ejection system 56 moves away from the outlet 32.

There is also illustrated a partial bale ejection system 60, the term "partial" refers to the length of the system relative to the main bale chamber 26 and not to a bale that is of a smaller size. The partial bale ejection system 60 includes an actuator 62, tines 64 and a tine extension/retraction device 66. The partial bale ejection system 60 is tasked with the ejection of the rearmost bale on the floor 52 to, and out of, the outlet 32. It is contemplated that the partial bale ejection system 60 can operate independently or in coordination with the bale ejection system 56. For example, the partial bale ejection system 60 could move each time the bale ejection system 56 moved to thereby distribute the load of moving the bales. Although the main purpose of the partial bale ejection system 60 is to operate independent of the bale ejection system 56, in that when the baling operation in the field is complete the operator can trigger the partial bale ejection system 60 to move the most rearward bale out of the main bale chamber 26 through the outlet 32, so that the bale will not be in the baler 10 and potentially become dislodged during transport of baler 10 to another field. The partial bale ejection system 60 also serves to lighten the load carried by the baler 10 during transport by expelling the rearmost bale.

Figure 3:
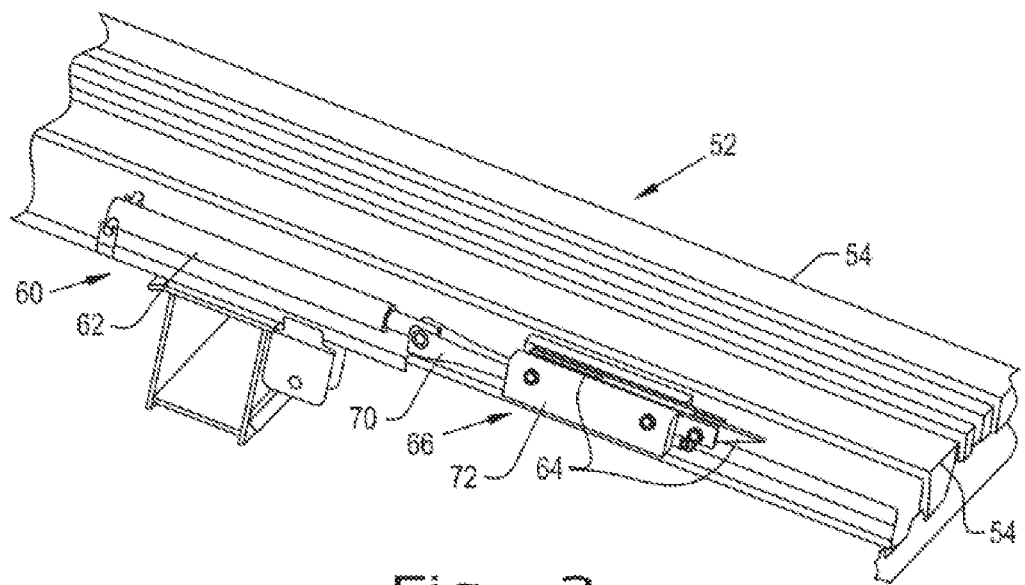
FIG. 3 is a partial cut-away view showing the partial bale ejector system fully retracted in the floor of FIG. 2.

Now, additionally referring to FIGS. 3-6, there is shown a sequence of events that take place during the cycling of the partial bale ejection system 60. In FIG. 3, the partial bale ejection system 60 is in a retracted, inactivated state, and the bales move on the slats 54 thereabove with the tines 64 being in a retracted position. Having the tines 64 in a retracted position advantageously prevents wearing of the tines 64 as the crop material of the bales move in a rearward direction.

Figure 4:
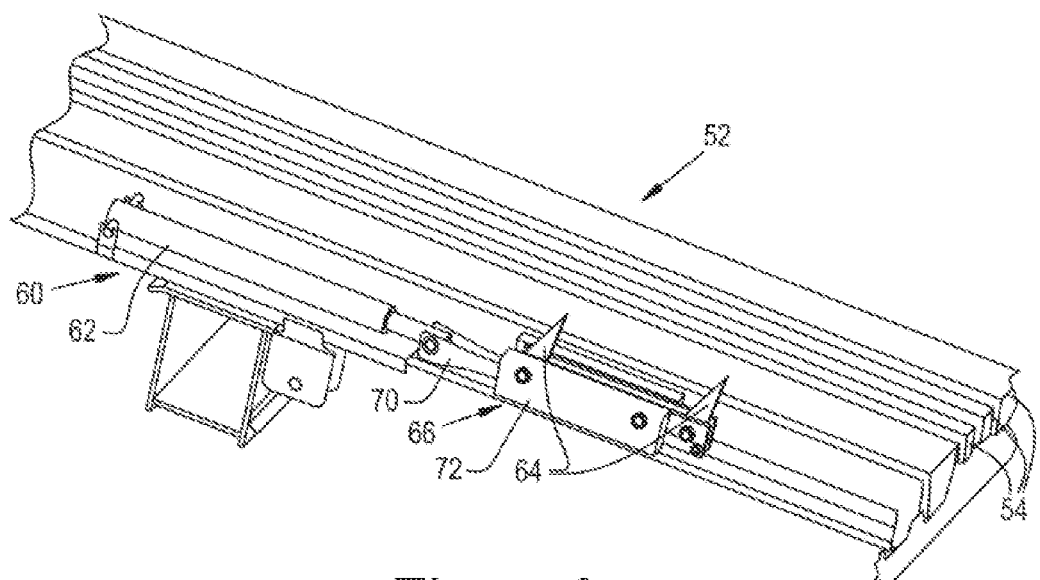
FIG. 4 is another partial cut-away view similar to FIG. 3 showing the partial bale ejector system still fully retracted in the floor of FIGS. 2 and 3, but with the tines extended.

In FIG. 4, the partial bale ejection system 60 has been activated and the tines 64 have been extended by the extension/retraction device 66 prior to moving the bale above. The extension/retraction device 66 can be a separate actuator that carries this process out; however, for purposes of discussion it will be considered that the device 66 is a mechanism that is driven by the actuator 62 causes the tines 64 to extend, which takes place prior to the actuator 62 driving the bale in a rearward direction.

Figure 5:
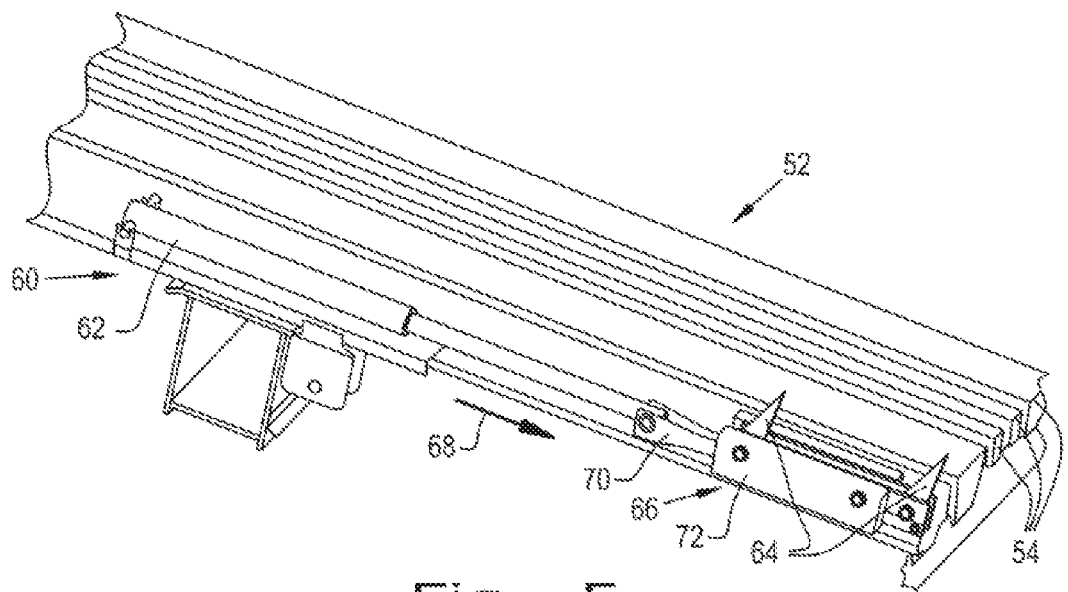
FIG. 5 is another partial cut-away view similar to FIGS. 3 and 4 showing the partial bale ejector system fully extended in the floor of FIGS. 2-4, with the tines extended, having ejected a rearmost bale.

In FIG. 5, the actuator 62 has been fully driven in a direction 68 and the rearmost bale that was above will have passed out of the outlet 32 and onto the ground or onto another bale handling device (not shown). The bale or bales setting forward of the rearmost bale will remain substantially in place in the main bale chamber 26.

Figure 6:
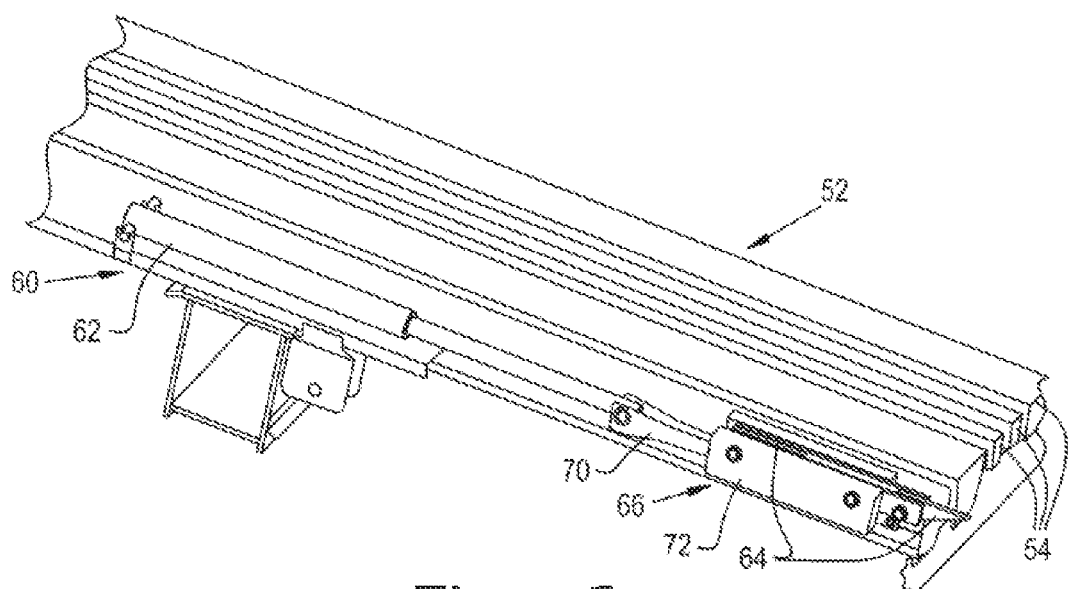
FIG. 6 is yet another partial cut-away view similar to FIGS. 3-5 showing the partial bale ejector system fully extended in the floor of FIGS. 2-4, with the tines having been retracted, before being repositioned in a home position as shown in FIG. 3.

In FIG. 6, a small movement of the actuator 62 in a direction opposite of direction 68 causes the tines 64 to retract before the device 66 moves toward the front of the main bale chamber 26 as the actuator 62 retracts to the position shown in FIG. 3. Again the retraction of the tines 64 prevents wearing of the tines 64 as they are moved or as the bales move on the floor 52.

Figure 7:
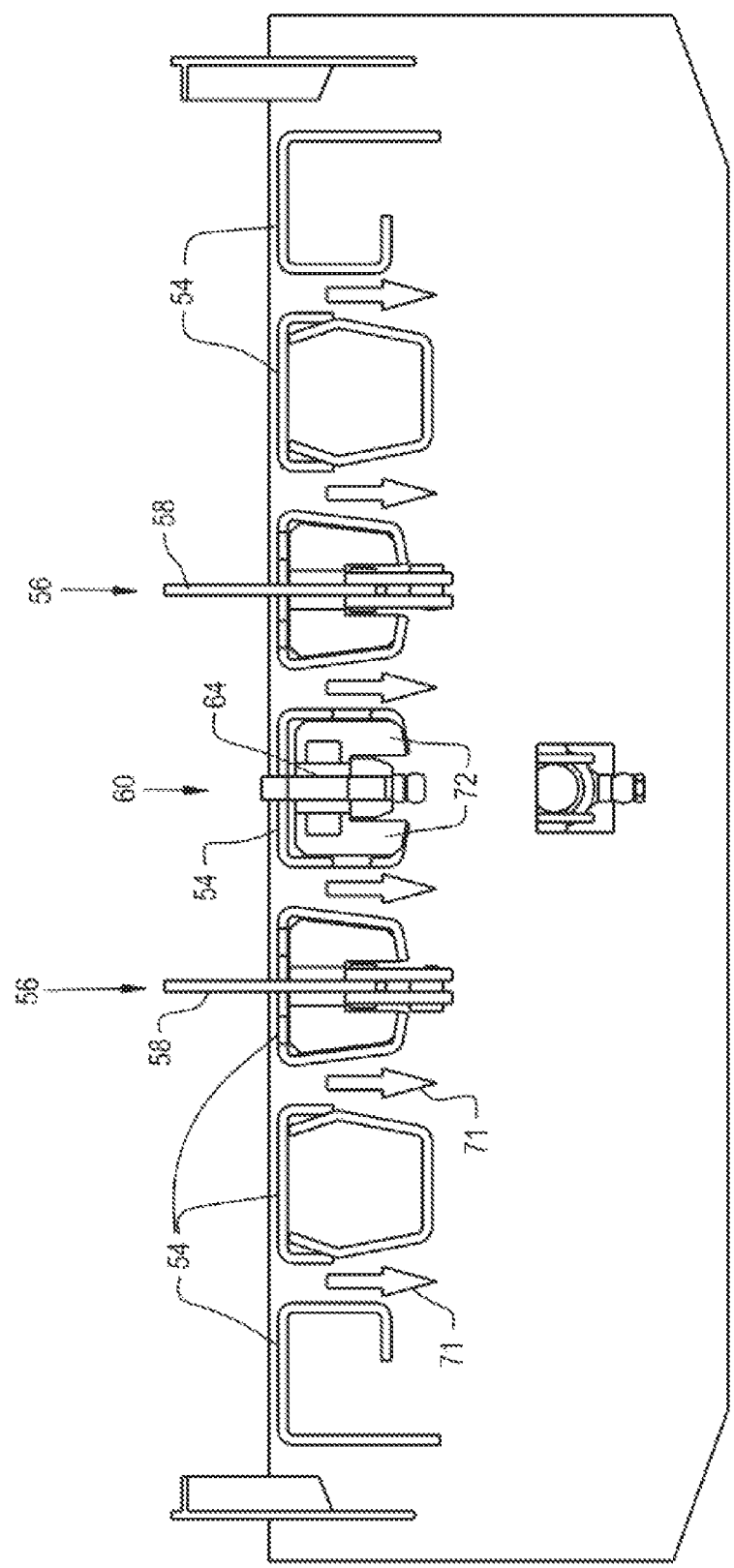
FIG. 7 illustrates an end view profile of the floor of FIGS. 2-6, illustrating the shapes of the bale support members and arrangements for the passing of crop material that has not been joined with the bale thereabove.

Now, additionally referring to FIG. 7, there is an end view of the floor 52 showing more details of the shape of the bale support members 54. The bale support members 54 may have different cross-sectional shapes, but the distance between the sidewalls of adjacent bale support members 54 increases in a direction 71. This increasing distance between the sidewalls provides for an unhindered flow of any crop material, such as chaff and small pieces that do not become part of the bale being formed or moved in the main bale chamber 26. Although some of the bale support members 54 may be generally rectangular in shape, such as the bale member 54 containing the partial bale ejection system 60, the distance between its sidewalls and those of the adjacent bale support member 54 increases in the direction 71. As can be seen in this illustration some of the bale support members 54 are generally trapezoidal in shape with the wider of the two parallel sides being the uppermost part.

Slots are arranged in the upper portions of some of the bale support members 54 for the movement of tines 58, which are spring biased in an upward direction. A slot is also arranged for the extension/retraction and travel of tines 64. Generally another wider slot is also arranged at the bottom of those bale support members that have an upper slot, again for the ease of the continuous downward flow of any crop material that may enter the upper slot.

In baler 10 full and partial bale eject systems 56 and 60 are situated in the same floor 52 profile proximate to the center, unlike prior art systems. Also, prior art systems used bale ejection tines that were passively punched into the bale, which requires a certain initial interference between the tines and the bales. In the prior art there is a continuous interference during the baling process that makes the tines wear and can lead to undesirable crop buildup in the mechanisms. Advantageously, the actuator 62 first pushes the tines 64 into the bale before starting a rearward movement of the bale. The present invention advantageously is a center positioned partial bale ejection system 60.

According to an aspect of the present invention, The partial bale ejection system 60 has an actuator 62 for moving the rearward bale and at least one tine 64 that is pushed into the rearward bale prior to the actuator 62 pushing the rearward bale alone toward and out the outlet 32.

Figure 8:
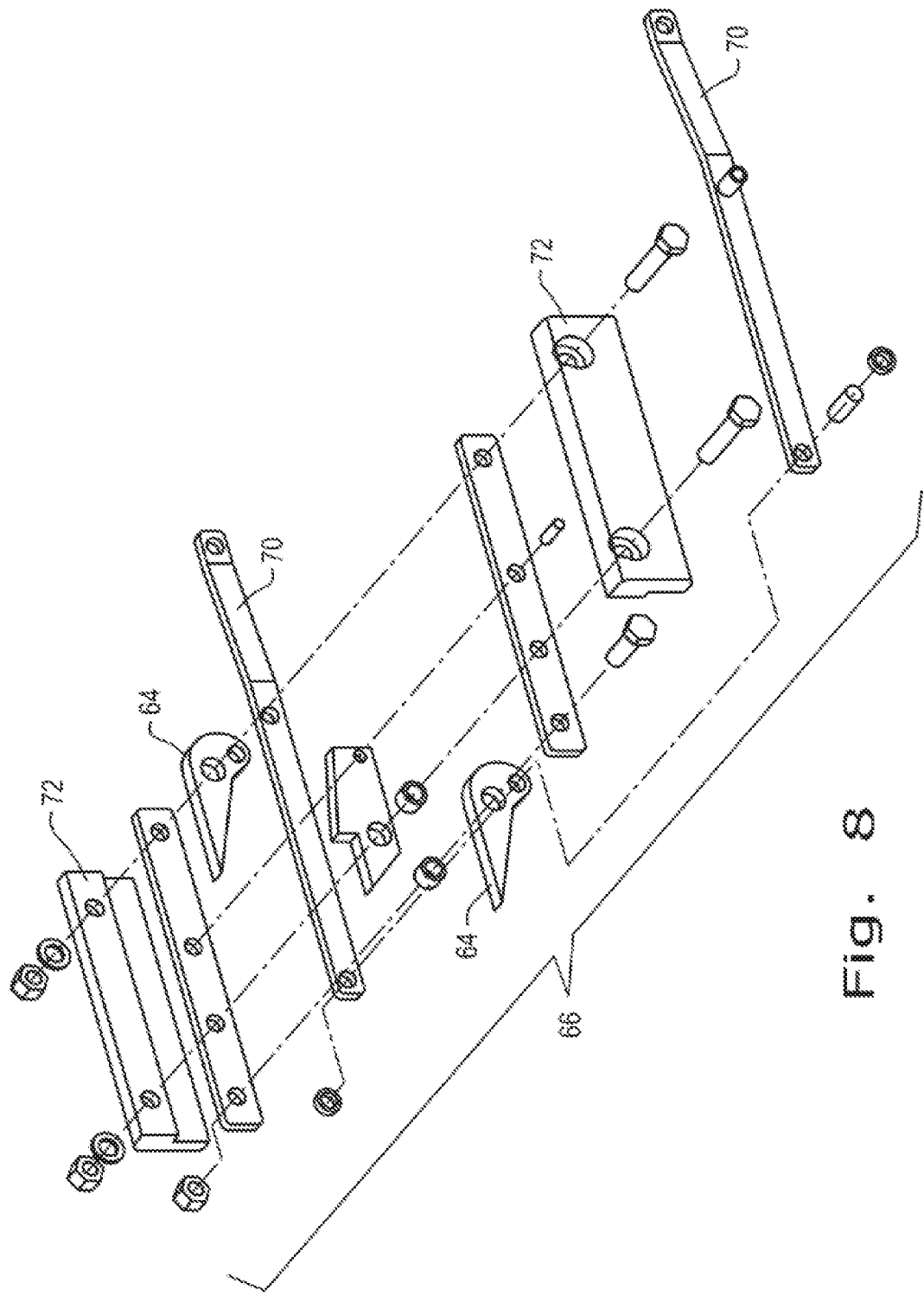
FIG. 8 is an exploded view of part of the partial bale ejector system illustrating an embodiment of a mechanism that extends and retracts the tines.

Now, additionally referring to FIG. 8 there is shown an exploded view of the extension/retraction device 66, illustrating actuation members 70 contained between sliding members 72. The actuation members 70 are on one side coupled to the actuator 62 and on the other side pivotally coupled to the tines 64. The sliding members 72 are configured to slide inside of a slat 54 as illustrated in FIG. 7. The tines 64 are also pivotally coupled to the sliding members 72. The actuation members 70 cause the tines 64 to extend in a pivoting manner upward when the actuator 62 moves in direction 68, then when the tines 64 are extended the force applied to the actuation members 70 cause the sliding members 72 to start moving in direction 68. Conversely when the actuator 62 is retracted in a direction opposite to direction 68, then the tines 64 pivot downwardly and retract, and then sliding members 72 slide in the direction opposite to direction 68.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler comprising:
a main bale chamber for the compressing of crop material into bales, the main bale chamber having a floor and an outlet for discharge of compressed crop material in the form of bales;
a bale ejection system at least partially incorporated in the floor for moving the bales substantially throughout the main bale chamber; and
a partial bale ejection system at least partially incorporated in the floor for moving a bale out the outlet, the partial bale ejection system arranged to move and eject a rearward bale proximate to the outlet of the main bale chamber, the partial bale ejection system being operable independent of the bale ejection system, the partial bale ejection system comprising:
 a tine extension/retraction device including sliding members;
 an actuator coupled to the tine extension/retraction device for moving the rearward bale, the actuator comprising an actuation member; and
 at least one tine that is pushed into the rearward bale by the tine extension/retraction device prior to the actuator moving the rearward bale alone toward and out the outlet, the at least one tine being pivotally coupled to the actuation member about one pivot, the at least one tine also being pivotally coupled to the sliding members about an other pivot,
 wherein the actuation member of the actuator slides between the sliding members of the tine extension/retraction device to pivot the at least one tine.

2. The agricultural baler of claim 1, wherein the at least one actuation member being coupled to the actuator for extending and retracting the at least one tine.

3. The agricultural baler of claim 2, wherein the actuation member fully extending or retracting the at least one tine before moving the sliding member.

4. The agricultural baler of claim 1, wherein the floor has a plurality of bale support members upon which the bale slides, said bale support members being shaped so that a distance therebetween is continuously increasing in a downward direction.

5. The agricultural baler of claim 4, wherein at least one of the bale support members has a generally trapezoidal shape with a widest of the two parallel sides being proximate to a top surface of the floor.

6. The agricultural baler of claim 4, wherein at least one of the bale support members has an upper slot therein through which the at least one tine can extend, move and retract through.

7. The agricultural baler of claim 6, wherein the at least one bale support member additionally has a lower slot therein, the lower slot having a wider opening than the upper slot of the at least one bale support member.

8. The agricultural baler of claim 4, wherein the partial bale ejection system is positioned in a central bale support member of the plurality of bale support members of the floor.

9. The agricultural baler of claim 1, wherein the sliding members are configured to slide inside of a slat.

10. The agricultural baler of claim 1, wherein the actuator extends the at least one tine into the rearward bale before the actuator applies a rearwardly directed force on the rearward bale.

11. The agricultural baler of claim 1, wherein the actuator retracts the at least one tine away from the main bale chamber prior to the actuator moving the tine extension/retraction device away from the outlet.

12. The agricultural baler of claim 1, wherein the at least one tine is not continuously biased in a generally upward direction.

13. A partial bale ejection system for use with an agricultural baler having a bale ejection system, the partial bale ejection system at least partially incorporated in a floor of the baler for moving a rearward bale out of an outlet, the partial bale ejection system comprising:
    a tine extension/retraction device comprising sliding members;
    an actuator for moving the rearward bale, the actuator being coupled to the tine extension/retraction device, the actuator comprising an actuation member; and
    at least one tine that is pushed into the rearward bale by the tine extension/retraction device prior to the actuator moving the rearward bale alone toward and out the outlet,
    wherein the actuation member of the actuator slides between the sliding members of the tine extension/retraction device to pivot the at least one tine, the partial bale ejection system being operable independent of the bale ejection system, the at least one tine being pivotally coupled to the actuation member about one pivot, the at least one tine also being pivotally coupled to the sliding members about an other pivot.

14. The partial bale ejection system of claim 13, wherein the actuation member being coupled to the actuator for extending and retracting that at least one tine.

15. The partial bale ejection system of claim 14, wherein the actuation member fully extending or retracting the at least one tine before moving the sliding member.

16. The partial bale ejection system of claim 13, wherein the sliding members are configured to slide inside of a slat.

17. The partial bale ejection system of claim 13, wherein the actuator extends the at least one tine into the rearward bale before the actuator applies a rearwardly directed force on the rearward bale.

18. The partial bale ejection system of claim 17, wherein the actuator retracts the at least one tine away from the main bale chamber prior to the actuator moving the tine extension/retraction device away from the outlet.

19. The partial bale ejection system of claim 13, wherein the at least one tine is not continuously biased in a generally upward direction.

20. A method of operating a partial bale ejection system of an agricultural baler, comprising the steps of:
    extending at least one tine into a rearward bale by sliding an actuation member of an actuator between sliding members of a tine extension/retraction device to pivot the at least one tine, the actuator being parallel with the sliding members, the extending at least one tine step operating independent of an operation of a bale ejection system in the agricultural baler, the at least one tine being pivotally coupled to the actuation member about one pivot, the at least one tine also being pivotally coupled to the sliding members about an other pivot;
    extending the sliding members to eject the rearward bale;
    retracting the at least one tine; and
    retracting the sliding members.

* * * * *